(12) United States Patent
Barbier

(10) Patent No.: US 8,244,116 B2
(45) Date of Patent: Aug. 14, 2012

(54) SYSTEM FOR HEATING PRESSURIZED LIQUEFIED GAS STORES

(75) Inventor: Jean-Paul Barbier, Fourqueux (FR)

(73) Assignee: L'Air Liquide Societe Anonyme pour l'Etude Et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 12/866,372

(22) PCT Filed: Jan. 28, 2009

(86) PCT No.: PCT/FR2009/050125
§ 371 (c)(1),
(2), (4) Date: Jan. 10, 2011

(87) PCT Pub. No.: WO2009/098425
PCT Pub. Date: Aug. 13, 2009

(65) Prior Publication Data
US 2011/0114667 A1 May 19, 2011

(30) Foreign Application Priority Data
Feb. 6, 2008 (FR) ...................................... 08 50751

(51) Int. Cl.
*F22B 1/28* (2006.01)
*B01D 1/26* (2006.01)
(52) U.S. Cl. ........................................ 392/400; 159/22
(58) Field of Classification Search .......... 392/386–406, 392/324–337, 449–464; 159/22
See application file for complete search history.

(56) References Cited

U.S. PATENT DOCUMENTS

| 4,978,832 | A  | * | 12/1990 | Rubin ........................... 392/400 |
| 6,473,563 | B2 | * | 10/2002 | Takamatsu et al. ........... 392/388 |
| 6,868,869 | B2 | * | 3/2005  | Olander ........................ 137/888 |
| 7,347,054 | B2 |   | 3/2008  | Rameau et al. |
| 7,596,305 | B2 | * | 9/2009  | Nelson .......................... 392/396 |
| 7,813,627 | B2 | * | 10/2010 | Sarigiannidis et al. ....... 392/400 |
| 2002/0124575 | A1 | | 9/2002 | Pant et al. |
| 2009/0090725 | A1 | | 4/2009 | Ravex et al. |

FOREIGN PATENT DOCUMENTS

EP 1 298 381 4/2003

OTHER PUBLICATIONS

PCT/FR2009/050125 Written Opinion dated Aug. 13, 2009.
International Search Report for PCT/FR2009/050125, mailed Aug. 13, 2009.

* cited by examiner

*Primary Examiner* — Daniel L Robinson
(74) *Attorney, Agent, or Firm* — Allen E. White

(57) ABSTRACT

The invention relates to a device for storing and distributing a high-purity pressurized liquefied gas at a rate which is higher than or equal to 1 kg/h, said device having: a container comprising a liquefied phase of said gas in its lower part, and a gaseous phase of said gas in its upper part, a system for bleeding the gaseous phase of said gas, and a heating system used to maintain a constant pressure of the gas at the moment of use. The invention is characterized in that the heating system involves the circulation of a hot fluid in a circuit built into the surface of the container.

2 Claims, 1 Drawing Sheet

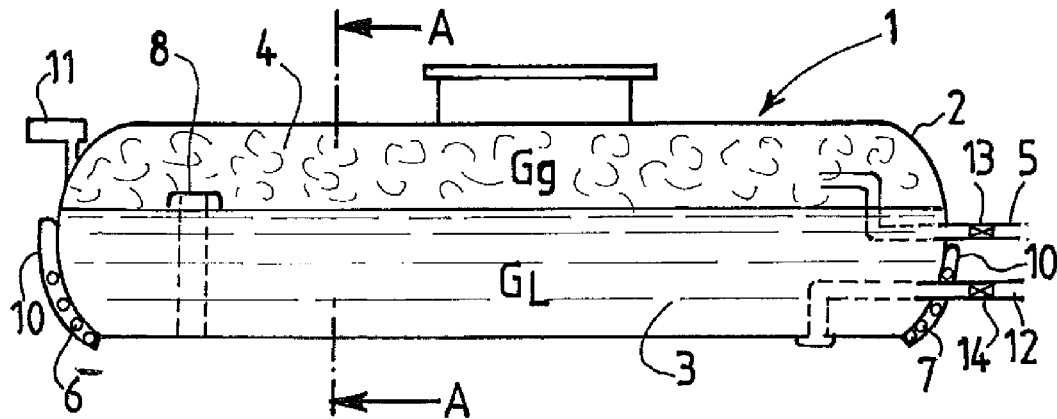
FIG.1
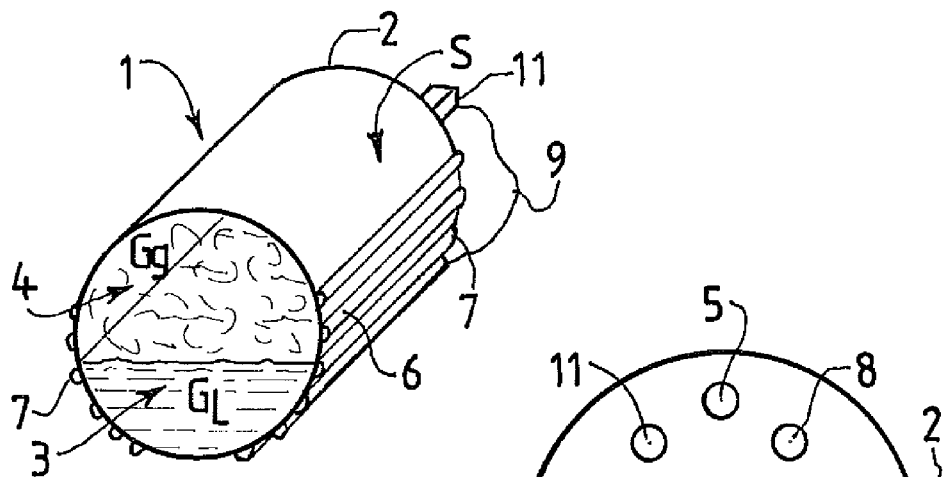
FIG.2
FIG.3
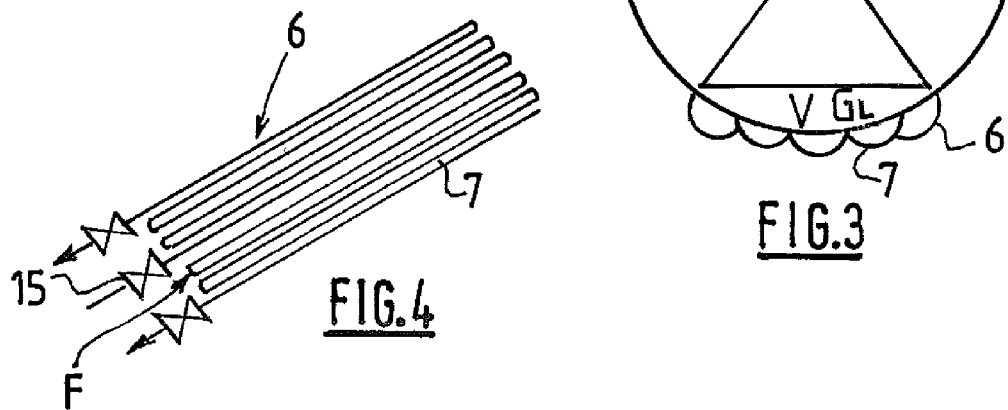
FIG.4

SYSTEM FOR HEATING PRESSURIZED LIQUEFIED GAS STORES

CROSS-REFERENCE TO RELATED APPLICATIONS

This application is a §371 of International PCT Application PCT/FR2009/050125, filed Jan. 28, 2009, which claims §119(a) foreign priority to French national application 0850751, filed Feb. 6, 2008.

BACKGROUND

1. Field of the Invention

The present invention relates to a device for storing pressurized liquefied gas, notably ammonia or chlorine, and for distributing said gas at a high rate in the form of a high purity gas. A high rate is understood to mean a rate greater than or equal to 1 kg/h and preferably greater than 10 kg/h.

2. Related Art

Some industries, such as those producing semiconductors, solar cells or optical fibers are confronted at the present time with increasing requirements for high purity gas at various stages of production. Some of these gases such as HCl, $Cl_2$, HBr, $N_2O$, $NH_3$, $WF_6$, $BCl_3$, 3MS, to mention only a few of these, are liquefied at ambient temperature and on account of this present distribution difficulties. These difficulties are directly linked to their pressure and/or their rate of use.

A liquefied gas is composed of two liquid and gaseous phases in equilibrium with each other. This equilibrium implies that at a given temperature, a liquefied gas has a well defined pressure and that this pressure varies as a function of temperature according to a relationship that is unique to each gas. In point of fact, the pressure increases as the temperature increases and conversely.

When the gaseous phase is drawn off from a liquid gas vessel, part of the liquid should be converted into gas so as to regenerate gas as it is used in order to maintain equilibrium. The liquid then starts to boil using available energy (typically energy from the external environment surrounding the vessel). The greater the draw-off rate the greater the energy requirement and the more the liquid boils violently and in this way creates a high risk of entraining droplets loaded with impurities in the gas phase. These droplets not only contaminate the gas but also accelerate corrosion phenomena and bring about instabilities in flow regulation and pressure measurements. If the available energy is not sufficient to turn the liquid to gas and in this way to generate the vapor phase, the temperature (and therefore the pressure) falls since equilibrium must be maintained.

In the case of pressurized liquefied ammonia (the reasoning would be identical with another gas) vaporization of the liquid ammonia phase at a temperature of 20° C., its vapor pressure being 8.7 bar, is accompanied by extraction of heat ($Q_{vapNH_3}$) by approximately 250 kcal per kilogram of ammonia. Thus vaporization of ammonia at a rate of 100 kg/h corresponds to the extraction of 25000 kcal/h.

In an ISO vessel of 20000 kg of ammonia, this heat extraction has the effect of reducing the temperature (T) of ammonia by $\Delta T = Q_{vapNH_3}/M_{NH_3} Cp_{NH_3}$, $M_{NH_3}$ being the total mass of ammonia in the ISO-vessel and $Cp_{NH_3}$ its specific heat at its vapor pressure: $Cp_{NH_3}$=1.1 kcal/kg. ° K at 8.7 bar. Also, vaporization of 100 kg/h of ammonia will lower its temperature by approximately 1.1° C. per hour ($\Delta T$=25000/20000×1.1).

It is thus possible to reach extremely low temperatures. The tendency in industry is to require higher gas flow rates and larger vessels, which increases cooling problems. By using the largest pressurized liquefied gas vessels, support and maintenance of many small vessels is eliminated and space is saved. Moreover, the frequency at which the vessel is changed is reduced, in this way reducing the risk of more frequent gas escapes during the steps of connecting and disconnecting vessels.

This cooling results in a lowering of the gas vapor pressure. For example, for ammonia, the vapor pressure will not exceed 6.3 bar at 15° C., 4.3 bar at 0° C. and 2 bar at −20° C.

In order to keep the gas pressure constant at the point of use it is thus necessary to keep its temperature constant. For this, it is necessary to provide a quantity of heat at least equal to the production of cooling ($Q_{vapgaz}$).

An external supply of energy by heating makes it possible to limit cooling and the pressure drop observed. Several solutions may then be envisaged.

A first solution currently used consists of heating the gas vessel over all its height and keeping a constant heating temperature greater than ambient temperature. This solution requires complete tracing of the installation downstream of the vessel since the gas leaves the vessel at a temperature greater than ambient temperature. In point of fact, by applying such a solution, the pipeline for transporting gas at ambient temperature would create condensation and therefore bring about the presence of liquid in the pipeline, which is not acceptable since this would notably bring about heterogeneities in the flow rate of the product.

In patent application EP1538390 an induction heating system is described for a bottle containing liquefied gas. Patent application EP1298381 describes a device for heating a pressurized liquefied gas where the heating device is in permanent contact with said vessel and consists of electrical heating means. Patent application US 2002/0124575 describes a method for controlling the temperature of a pressurized liquefied gas situated in a storage device heated by a heat source outside said storage device.

However, such devices are still not satisfactory. In point of fact, the gases used in the applications described above are corrosive and flammable, while with an electrical heating system the risk of an explosion linked to escapes of such gases cannot be excluded. Also, it is impossible for example to use a sprinkler cooling system in case of necessity on account of these electrical systems. Risks of burns, corrosion of the storage vessel and electrocution are also highly probable. In addition, cleaning, maintenance and replacement of equipment in case of breakdowns are complex, risky and costly.

SUMMARY OF THE INVENTION

One object of the present invention is to overcome all or part of the disadvantages of the prior art noted above.

To this end, the main subject of the present invention is a device for storing and distributing a high purity pressurized liquefied gas at a rate greater than or equal to 1 kg/h comprising:
- a vessel containing a liquefied phase $G_L$ of said gas in its lower part and a gaseous phase $G_g$ in its upper part,
- a system for drawing off the gaseous phase $G_g$ of said gas,
- a heating system designed to maintain a constant pressure of the gas at the point of use, characterized in that the heating system consists of a circulation of a hot fluid F in a circuit built into the surface S of the vessel.

In addition, embodiments of the invention may comprise one or more of the following features:

The previously defined device is characterized in that said circuit has tubes on the outer surface S of the vessel. Preferably, the tubes are welded onto the outer surface of the vessel.

The previously defined device is characterized in that the tubes and the vessel are made of stainless steel.

The previously defined device is characterized in that the heating system is distributed over the lower quarter of the outer surface of the vessel.

The previously defined device is characterized in that the flow of gas withdrawn lies between 1 kg/h and 100 kg/h, preferably between 10 kg/h and 50 kg/h.

The previously defined device is characterized in that the capacity of the vessel lies between 1 tonne and 100 tonne, preferably between 10 tonne and 40 tonne.

The previously defined device is characterized in that a liquid level indicator is present in the vessel.

The previously defined device is characterized in that it comprises means for regulating the flow of hot fluid F circulating in the heating system according to the pressure of the gas.

The previously defined device is characterized in that the temperature of the hot fluid F is less than or equal to 50° C.

The devices for distributing hot liquids require a heating system designed to heat all the surface of the vessel containing said liquid. The liquids do not have a significant vapor pressure as in the case of pressurized liquefied gases and it is therefore possible to heat them at temperatures higher than 50° C.

Applications for the two devices are thus totally distinct and the technological fields too far apart for a comparison to be made of the various types of device and their components.

The previously defined device is characterized in that it has an insulating system covering at least part of the outer surface S of the vessel on which the heating system is incorporated.

The previously defined device is characterized in that the high purity pressurized liquefied gas is ammonia.

According to a preferred embodiment of the present invention, the tubes of the heating circuit and the vessel of the device as defined above are made of the same material. Said material may be copper and, preferably, said material is a stainless steel.

The hot fluid F circulating in the heating system defined above is chosen from water, oil or another heat carrying liquid. Said fluid is preferably water.

According to a particular embodiment of the invention, the vessel of the device defined above is a vessel mounted on a semi-trailer chassis. Preferably, said vessel is an iso vessel.

A high purity gas is understood to mean a gas of which the purity is greater than or equal to 99.99%, preferably greater than or equal to 99.999% and even more preferably greater than or equal to 99.9999%.

According to an embodiment of the device that is the subject of the present invention, the means for recycling hot fluid is situated at the outlet from the heating system.

BRIEF DESCRIPTION OF THE FIGURES

Other special features and advantages will become apparent on reading the following description made with reference to the figures in which:

FIG. 1 shows a longitudinal schematic section of a device according to the invention, FIG. 2 shows a perspective view of a cross section along the line A of a detail of the device shown in FIG. 1, FIG. 3 shows a schematic cross section of another example of an embodiment of a device according to the invention, FIG. 4 shows a detailed schematic view of the devices shown in FIGS. 1 to 3, illustrating the tubes of the heating system incorporated in the vessel of the device according to the invention.

DETAILED DESCRIPTION OF THE INVENTION

A device 1 for storing and distributing a pressurized liquefied gas is shown in FIG. 1 comprising a vessel 2. The lower part 3 of the vessel 2 is filled with the liquefied phase $G_L$ of the gas stored and the upper part 4 is filled with the gaseous phase $G_g$ of the gas stored. A draw-off system 5 is also present on the upper part of the vessel 2. This draw-off system 5 is designed to withdraw the gaseous phase Gg of the pressurized corrosive liquefied gas used for applications associated with the device of the present invention. The draw-off system 5 consists for example of a pipe situated in the upper part 4 inside the vessel 2. Thus, by virtue of such a draw-off system 5, impurities dissolved in the liquid phase are not entrained.

Since the vessel 2 may contain corrosive gases, for example ammonia, it should consist of a material that is compatible with and not corroded by said gas. Thus, the vessel 2 is for example made of stainless steel, stainless steel 304 being particularly well suited. The vessel 2 has a large capacity and consists for example of an ISO vessel that can contain 10 to 50 tonne of pressurized liquefied corrosive gas so that it only has to be filled or changed once or twice a month so as to limit the frequency of this delicate operation as regards safety.

The device 1 comprises a heating system 6 incorporated in the vessel 2. The heating system 6 has the function of compensating for the cooling of the liquid $G_L$ due to vaporization, and in this way prevents a pressure reduction of the gaseous phase $G_g$. In a preferred manner, the heating system 6 is situated on the lower part of the outer surface of the vessel 2, as shown in FIG. 1. The object of this structure is then to heat only the liquid phase $G_L$ so as to limit the transfer of impurities dissolved in the liquid phase $G_L$ to the gaseous phase $G_g$ by partially recondensing the unheated gaseous phase $G_g$ once again entraining any impurities passing to the liquid phase $G_L$.

The device 1 is provided with valves 13 and 14 controlling the liquefied gas $G_L$ entering through the duct 12 and the gas leaving through the duct 5.

The device shown in FIG. 1 also includes a liquid level indicator 8 contained in the vessel 2. This indicator 8 has the function of informing the user of the level of liquid remaining in the lower part 3 of the vessel 2. In this way, said user may act so as to leave residual liquid (for example 10%) in order to prevent impurities dissolved in the liquid phase from being entrained in the gaseous phase if the liquid totally vaporizes. As a variant, the device 1 may include a system for weighing the vessel 2 in place of the level indicator 8.

As a variant, a heat insulating system 10 is installed so as to cover the heating system 6 incorporated in the vessel 2. A first heat insulation technique applied to the vessel 2 comprises the following steps:

Step a): Installing a rigid leak free envelope made for example of aluminum or PVC outside the vessel 2 at a distance of between 50 mm and 200 mm.

Step b): Injection of polyurethane inside the jacket formed in step a).

Another heat insulation technique applied to the vessel 2 comprises the following steps:

Step a): Adhering sheets of insulating material, for example solid polyurethane, having a thickness of between 50 mm and 200 mm, to the outside of the vessel 2.

Step b): Installing an envelope made for example of aluminum or PVC on the sheets.

A pressure sensor 11 may also be present. This sensor 11 is connected by a connecting means 9 to the heating system 6 as shown in FIG. 2.

A device 1 is shown in FIG. 2 comprising a vessel 2 having a surface S on which a circuit 6 is welded, consisting of tubes 7 in which a hot fluid F circulates.

The tubes 7 are shown in FIG. 4, the heated fluid F entering the tubes as shown by the arrow in FIG. 3. The heated fluid F flow is regulated by means of a regulating valve 15 according to the gas pressure that is linked to its temperature. The gas pressure is chosen so that there is no condensation in the pipe work downstream of the vessel 2. The pressure is measured by means of the pressure sensor 11.

Circulation of the fluid F is stopped when the vapor pressure of the liquefied corrosive gas corresponds to a liquid phase temperature of 50° C. and/or as soon as the residual liquid level represents no more than 10% of the initial volume.

The heating system 6 may cover 5% to 90% of the surface of the vessel 2, preferably 10% to 50% of the outer surface. In a particularly preferred manner, the heating system covers the lower quarter of the outer surface S of the vessel 2, as illustrated in FIG. 3. In this example of an embodiment, circulation of hot fluid F takes place in the tubes 7 welded on the lower quarter of the outer surface S of the vessel 2, so as to heat only the volume V of the liquid phase until 90% is used. The hotter liquid at the bottom rises upward by gravity and convection. According to a particular embodiment of the invention, the tubes 7 are made of stainless steel and are welded onto the outer surface S of the vessel 2 which is also made of stainless steel.

In the case where the fluid F is water, the heat input occurs by circulating previously heated water at a maximum temperature of 50° C. ($T_i$) in the tubes 7 welded to the surface S of the vessel 2. The temperature of the heated fluid F is limited to 50° C. so as not to create a dangerous gas pressure when the vessel is full.

Considering that the water temperature leaving the heating system 6 is 30° C. (Tf) and that heat exchanges have only occurred between the pressurized liquefied gas and water, we can establish: $Q_{vapgaz}=M_{eau} \times Cp_{eau} \times (T_i - T_F)$. This corresponds to a water flow rate for example for ammonia of $M_{eau}=Q_{vapNH_3}/Cp_{eau}(T_i - T_F)=25000/1 \times 20=1250$ l/h.

Such a device makes it possible to ensure both a high purity corrosive gas leaving the vessel and a high gas distribution flow rate.

The purity of the gas provided is a critical factor for a gas distributing device. In point of fact, impurities may come from the starting raw materials, its contamination by air in the case of leakages, or of grease or oil coming from the manufacture of the vessel. This should thus be previously cleaned, be compatible with the gas that it contains and be periodically cleaned from corrosion from vessels through the corrosive gases that it contains. Corrosion caused by the liquid phase is more rapid than that caused by the gaseous phase. With a heating system 6 as shown schematically in FIG. 3, 10% of the liquid is heated, and a temperature gradient is then present. In point of fact, the temperature increases from the lower part to the upper part of the vessel. Now, the higher the temperature the greater the corrosion, and corrosion impurities in the gaseous phase are then less numerous, (by several orders of magnitude) than in the liquid phase. Thus, the heating system according to the invention makes it possible to minimize contamination by metallic impurities, and on account of this to provide high purity gas, for example 99.9999%, compatible with the electronics or optoelectronic industries.

According to a particular embodiment of the invention, the heating system 6 is put into permanent contact with the outer surface S of the vessel 2, for example by welding or by adhesion.

The system of heating by circulating hot fluid in the tube 7 incorporated in the outer surface S of the vessel 2 limits, during changes of vessels, maneuvers for fixing the heating system to connections to hot fluid inlet pipes and fluid outlet pipes.

The temperature of the fluid at 50° C. does not bring about the risk of burning or electrocution.

The risk of explosion associated with escapes of flammable gases (for example ammonia) are not present as is the case for electrical heating.

It is possible to use automatic sprinkler systems in case of necessity for the vessel 2 in order to cool it, which is more difficult for electric heating.

The device according to the invention is applicable not only to the storage and distribution of ammonia but also in all applications concerning special gases employed, notably electronics.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A device for storing a compressed high purity liquefied gas and distributing a flow greater than or equal to 1 kg/h of the compressed high purity liquefied gas comprising:
   a) a vessel containing a liquefied phase of said gas in its lower part and a gaseous phase of said gas in its upper part,
   b) a liquid level indicator,
   c) a delivery system operably connected to the vessel and adapted for drawing off the gaseous phase of said gas,
   d) a heating system comprising a circulation of a hot fluid in a stainless steel tubing circuit on at least a lower quarter surface of the vessel and adapted to maintain a constant pressure of the gas at a point of delivery in fluid communication with the delivery system,
   e) a regulator configured to regulate the flow of hot fluid circulating in the heating system according to the pressure of the gas, and
   f) an insulating system covering at least part of the outer surface of the vessel on which the heating system is incorporated,
   wherein a temperature of the hot fluid is less than or equal to 50° C., the capacity of the vessel lies between 1 metric ton and 100 metric ton, and the flow of gas withdrawn lies between 1 kg/h and 100 kg/h.

2. The device of claim 1, wherein the high purity pressurized liquefied gas is ammonia.

* * * * *